US012387888B2

(12) United States Patent
Takacs

(10) Patent No.: US 12,387,888 B2
(45) Date of Patent: Aug. 12, 2025

(54) HIGH VOLTAGE DISCONNECT SWITCH WITH SWITCH INTERRUPTER HAVING AN ACTUATING ARM ACTUATED BY AN ARC HORN WITH A SPRING CATCH

(71) Applicant: CLEAVELAND/PRICE INC., Trafford, PA (US)

(72) Inventor: Timothy Joseph Takacs, Larimer, PA (US)

(73) Assignee: CLEAVELAND/PRICE INC., Trafford, PA (US)

( * ) Notice: Subject to any disclaimer, the term of this patent is extended or adjusted under 35 U.S.C. 154(b) by 344 days.

(21) Appl. No.: 17/962,588

(22) Filed: Oct. 10, 2022

(65) Prior Publication Data

US 2023/0223220 A1 Jul. 13, 2023

Related U.S. Application Data

(60) Provisional application No. 63/298,286, filed on Jan. 11, 2022.

(51) Int. Cl.
*H01H 31/30* (2006.01)
*H01H 1/26* (2006.01)
(Continued)

(52) U.S. Cl.
CPC .............. *H01H 31/30* (2013.01); *H01H 1/26* (2013.01); *H01H 1/42* (2013.01); *H01H 33/121* (2013.01); *H01H 33/20* (2013.01)

(58) Field of Classification Search
CPC ............ H01H 31/30; H01H 1/26; H01H 1/42; H01H 33/121; H01H 33/20; H01H 33/30
See application file for complete search history.

(56) References Cited

U.S. PATENT DOCUMENTS 3,544,741 A * 12/1970 Kuhn ........................ H01H 1/42 200/256
4,339,636 A * 7/1982 Cleaveland .......... H01H 31/023 403/57

(Continued)

FOREIGN PATENT DOCUMENTS

GB 1371422 * 10/1974 ............... H01H 1/42

OTHER PUBLICATIONS 17-7PH Nickel Coated Spring Wire ASTM A313, AMS 5678, 2017, Gibbs Interwire (Year: 2017).*

*Primary Examiner* — Renee S Luebke
*Assistant Examiner* — Robert M Schmitz
(74) *Attorney, Agent, or Firm* — Ronald S. Lombard

(57) ABSTRACT

A high voltage air disconnect switch having an electrical load interrupter unit responsive to the opening of the high voltage air break disconnect switch. The electrical load interrupter unit including an actuating arm is contacted, during the opening of the switch, by a moving arc horn attached to and in electrical circuit with a switch blade of the high voltage air disconnect switch. The moving arc horn has operatively attached a spring catch which engages the actuating arm with a physical holding force applied to an electric contact point between the actuating arm and the moving arc horn to firmly capture the interrupter actuating arm against the moving arc horn during opening of the switch to prevent any arc burning damage due to arcing between the actuating arm and the moving arc horn as the switch opens.

11 Claims, 2 Drawing Sheets

(51) Int. Cl.

| | |
|---|---|
| ***H01H 1/42*** | (2006.01) |
| ***H01H 33/12*** | (2006.01) |
| ***H01H 33/20*** | (2006.01) |

(56) References Cited

U.S. PATENT DOCUMENTS

| | | | | |
|---|---|---|---|---|
| 9,396,895 | B2 * | 7/2016 | Demissy .............. | H01H 31/026 |
| 9,881,755 | B1 * | 1/2018 | Cleaveland .............. | H01H 3/46<br>307/112 |
| 10,242,825 | B1 | 3/2019 | Kowalik et al. | |
| 10,896,789 | B2 * | 1/2021 | Strand ...................... | H01H 1/42<br>218/23 |

* cited by examiner

HIGH VOLTAGE DISCONNECT SWITCH WITH SWITCH INTERRUPTER HAVING AN ACTUATING ARM ACTUATED BY AN ARC HORN WITH A SPRING CATCH

CROSS-REFERENCE TO RELATED APPLICATION

This application claims the benefit of U.S. Provisional Patent Application No. 63/298,286 filed Jan. 11, 2022, which is incorporated herein by reference in its entirety.

BACKGROUND OF THE INVENTION

The present invention relates to a high voltage air break disconnect switch, and, in particular, to a high voltage air disconnect switch having an electrical load interrupter unit responsive to the opening of the high voltage air break disconnect switch. The electrical load interrupter unit including a tubular actuating arm which is contacted and actuated, during the opening of the switch, by a moving arc horn attached to and in electrical circuit with a switch blade of the high voltage air disconnect switch.

When such a high voltage air break disconnect switch is in the closed electrically conductive position the interrupter unit is not in the current path of the high voltage air disconnect switch. When opening such a high voltage disconnect switch to the open electrically nonconductive position, the switch blade begins its opening rotary motion and the attached moving arc horn contacts the actuating arm and a parallel electrical current path is established through the arcing components, i.e., the actuating arm and the moving arc horn. When the moving arc horn contacts the actuating arm, the electrical current of the high voltage disconnect switch is commuted to the interrupter. As the switch blade continues its rotary motion the moving arc horn slides along the tubular actuating arm until the moving arc horn reaches the end of the actuating arm and slides off and releases the actuating arm, which is typically spring-loaded, to reset for a next operating stroke. Once the high voltage air disconnect switch is fully electrically closed, the interrupter unit including the actuating arm is out of the electrical current path of the high voltage air disconnect switch.

The switch blade of a high voltage air break disconnect switch having such an interrupter unit, has the moving arc horn attached to and in electrical circuit with the switch blade. Problems may arise with such a high voltage disconnect switch during switch opening, because the moving arc horn may strike the interrupter unit actuating arm with enough force and velocity to cause the moving arc horn and the actuating arm to lose contact due to bouncing between one another at a contact point on the moving arc horn. As can be seen, for example, in the prior art switch of FIG. 1A, when the switch 10 opens, the moving arc horn 104, indicated by point ‘A’, moves towards actuating arm 102, indicated by point ‘B’, as shown, at fast speed and point ‘A’ strikes point ‘B’ and causes a bounce and an electric arc and burning of the two metal surfaces of the moving arc horn 104 and the actuating arm 102. Thus, if the moving arc horn and the tubular actuating arm do not keep constant physical contact the entire time until the moving arc horn reaches the end of the actuating arm and slides off and the interrupter unit trips open, it can cause such electrical arc damage to the moving arc horn and the actuating arm, obviously reducing the life of these components. Also, shown in FIG. 1A is the continued motion of the blade 20 as it rotates open to the point where the interrupter trips open.

One high voltage air disconnect switch having such an interrupter unit that has been found to have such a bouncing problem is disclosed in U.S. Pat. No. 9,881,755 B1 dated Jan. 30, 2018, by Charles M. Cleaveland, entitled “Motorized High Voltage In-Line Disconnect Switch with Hand-Held Communication System to Prevent Unwanted Operation” assigned to the present assignee, Cleaveland/Price Inc. This patent discloses an in-line vertical break switch having such an interrupter unit, where the interrupter unit is a vacuum interrupter. The vacuum interrupter is described in column 7, lines 39-50 of said U.S. Pat. No. 9,881,755 B1 and shown in FIG. 11, for example. The said U.S. Pat. No. 9,881,755 B1 is incorporated herein by reference in its entirety as though fully set forth.

In view of the foregoing, it is therefore an object of the invention to devise an improved high voltage air disconnect switch having an electrical load interrupter unit, where the switch has been adapted to eliminate the described bouncing problem between the moving arc horn and the actuating arm.

SUMMARY OF THE INVENTION

The present invention provides a solution to the bouncing problem of the high voltage air disconnect switch having such an electrical load interrupter unit. The interrupter unit, as mentioned, typically includes the spring-loaded tubular actuating arm for contacting the moving arc horn. The moving arc horn is attached to and in electrical circuit with the movable switch blade of the high voltage air disconnect switch. The moving arc horn of the present invention has been modified from the prior art moving arc horn to operatively have attached to it a spring catch that together with a contact point or surface of the moving arc horn engages the actuating arm about its outer circumference with a physical holding force applied to the contact point between the tubular actuating arm and the moving arc horn to capture the outer circumference of the tubular interrupter actuating arm against the contact point of the moving arc horn during opening of the switch to prevent any arc burning damage due to arcing between the actuating arm and the moving switch blade. The spring catch together with the contact point of the moving arc horn forms a catch and trap zone to capture the tubular interrupter actuating arm so that it is held in continuous physical and electrical contacting relationship with the moving arc horn during opening of the switch.

The spring catch includes two oppositely positioned resilient spring guide fingers. Each resilient spring guide finger extends toward one another to form the catch and trap zone with the moving arc horn. The catch and trap zone has a holding action that provides sufficient contact force to keep the actuating arm and the moving arc horn together at the contact point. The catch and trap zone includes a catch and trap opening between the resilient spring guide fingers which is sized to allow the outer circumference of the actuating arm to slidably enter the catch and trap zone through the catch and trap opening upon initial contact of the actuating arm with the spring catch modified moving arc horn upon opening of the switch, but the tubular actuating arm, once captured, is prevented by the holding action of the catch and trap zone from exiting back through the catch and trap opening. The resilient spring guide fingers proximate the catch and trap opening then trap the actuating arm against the contact point of the moving arc horn to keep constant physical and electrical contact the entire time until the arc horn disengages from the actuating arm. This is accomplished by the spring force of the spring catch. The catch and trap zone of the resilient spring guide fingers permits the arc horn with the attached spring catch to slide along a length of the actuating arm until the arc horn slides off the end of the actuating arm as the switch opens.

The spring catch preferably includes a V-shaped chute guide. The V-shaped chute guide is formed by both resilient spring guide fingers beginning from the catch and trap opening retroverting away from each other to form the V-shaped chute guide having chute guide surfaces, with the chute guide surfaces enabling easy and reliable entry of the actuating arm into the catch and trap zone during opening of the switch. A chute guide entrance opening of the V-shaped chute guide preferably being larger than the catch and trap opening for the purpose of guiding the actuating arm into the catch and trap zone.

These and other aspects of the present invention will be further understood from the entirety of the description, drawings and claims.

BRIEF DESCRIPTION OF THE DRAWINGS

For a better understanding of the invention reference may be made to the accompanying drawings exemplary of the invention, in which.

DETAILED DESCRIPTION OF THE INVENTION

Figure 1A:
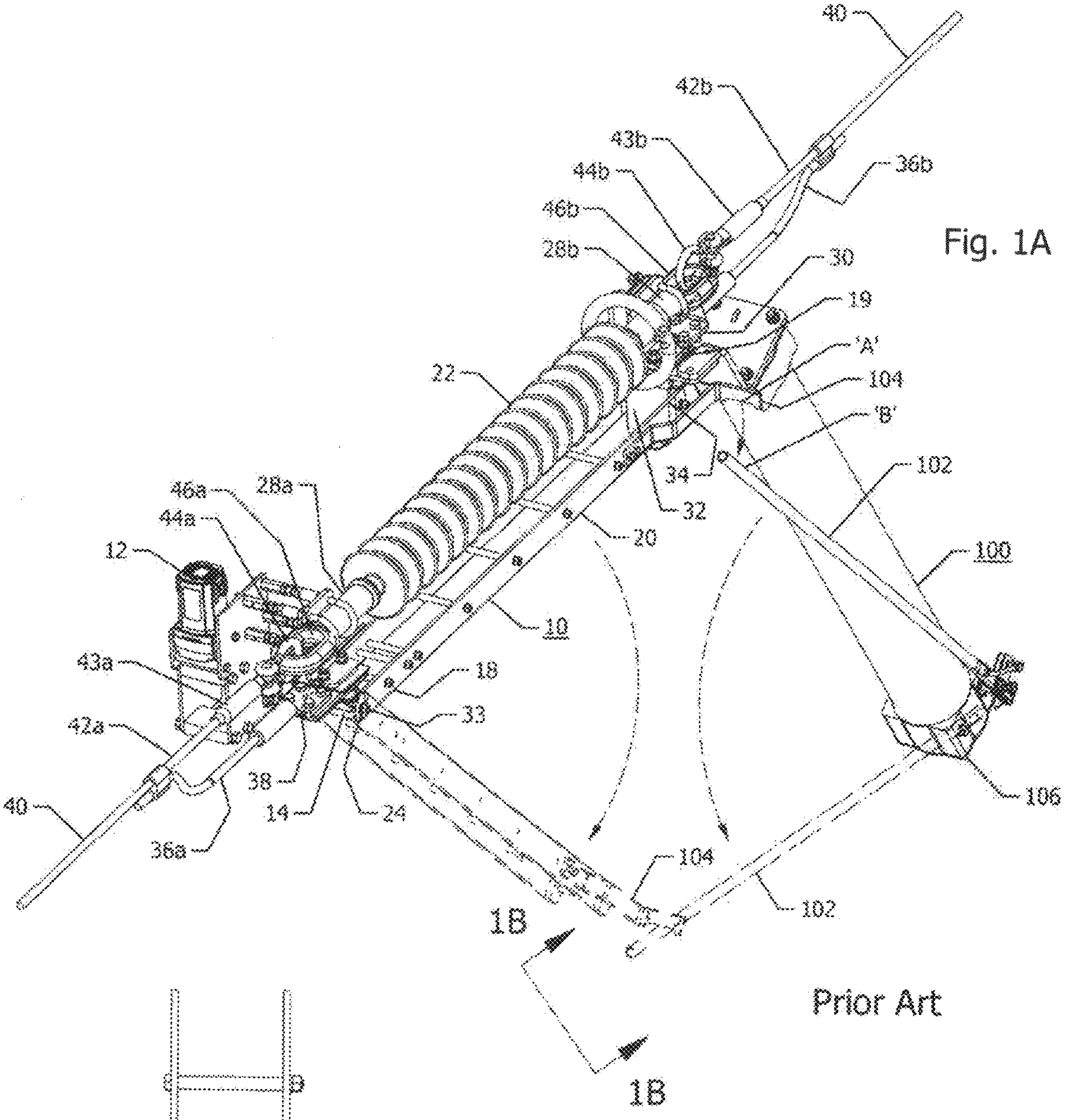
Fig. 1A Prior Art
FIG. 1A is a perspective view of a prior art high voltage air break disconnect switch with an interrupter unit showing the switch in both the electrically closed and partially open position.

FIG. 1A shows a prior art motorized in-line high voltage air break disconnect switch 10 including an attached electrical load interrupter unit 100. The switch 10 is shown as a vertical break disconnect switch and is described in the previously mentioned U.S. Pat. No. 9,881,755 B1 dated Jan. 30, 2018. This switch 10 includes a motor 12 for operating the switch. The switch 10 includes a rotating hinge contact end 14. The switch uses a polymer strain insulator 22 with other switch current carrying parts.

Other common switch current carrying parts of the switch 10 includes vertically rotating switch blade 20. A hinge contact member 24 is included at the hinge end 18 of the switch 10 and is connected in circuit to a hinge terminal 38. The hinge contact member 24 includes a hinge pin 33 that switch blade 20 rotates about during opening and closing of the switch. The hinge end 18 of the switch 10 is mounted proximate one end 28*a* of the strain insulator 22. The switch 10 also includes a break jaw end 19 which is mounted proximate the other end 28*b* of the strain insulator 22 and a switch break jaw contact terminal 30. The switch break jaw contact terminal 30 includes an integral break jaw contact 32 for contacting the switch blade end 34 when the switch is closed. The switch 10 also includes jumpers 36*a*, 36*b* attached in the circuit respectively, to a hinge terminal 38 and the switch break jaw terminal 30. As shown in FIG. 1A, a transmission line 40 has been cut, resulting in two transmission line ends 42*a*, 42*b*. Each transmission line end 42*a*, 42*b* is respectively attached to strain cable fittings 43*a*, 43*b* and to shackles 44*a*, 44*b*. The switch 10 is applicable to electric power lines including transmission lines and distribution lines, for example. The shackles 44*a*, 44*b* respectively engage chain eye end fittings 46*a*, 46*b* at the ends 28*a*, 28*b* of the strain insulator 22. The transmission line 40 can support the in-line vertical air break disconnect switch 10 without the switch 10 being attached directly to a dedicated support structure, such as metal framework. The jumpers 36*a*, 36*b* carry the transmission line current in circuit with the switch blade 20 via the contacts 32 and 24.

Figure 1B:
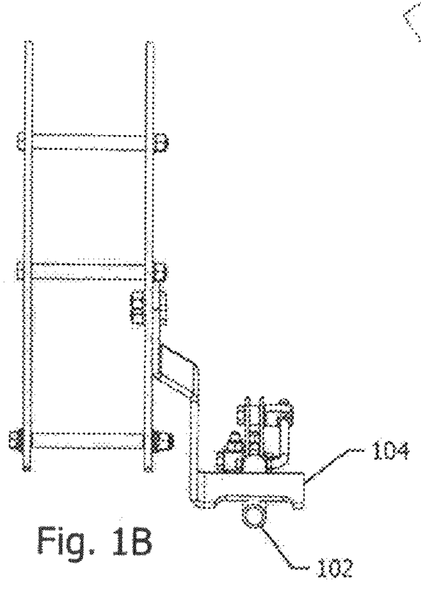
Prior Art Fig. 1B
FIG. 1B is an enlarged elevation view along the line '1B'-'1B' of FIG. 1A in the partially open position of the switch.

The electrical load interrupter unit 100 of the prior art switch in this embodiment is a vacuum interrupter attached to the switch break jaw terminal 30 as shown in FIG. 1A. An example of the internal mechanism of such a vacuum interrupter is disclosed in U.S. Pat. No. 10,242,825 B1 dated Mar. 26, 2019, by Peter M. Kowalik and Daniel J. Wolfe, entitled "High Voltage Switch Vacuum Interrupter" assigned to the present assignee, Cleaveland/Price Inc. The said U.S. Pat. No. 10,242,825 B1 is incorporated herein by reference in its entirety as though fully set forth. In addition to a vacuum interrupter, the present invention is also applicable to a sulfur hexafluoride gas (SF6) interrupter and an oil interrupter. The electrical load interrupter 100 includes housing 106 and a spring-loaded actuating arm 102 for actuating the internal mechanism, not shown in the drawings, containing springs within the housing 106. The spring-loaded actuating arm 102 is contacted by a moving arc horn 104 attached to and in electrical circuit with the movable switch blade 20 of the high voltage air disconnect switch 10. The spring-loaded actuating arm 102 typically is tubular, being hollow and having a circular cross-section. The moving arc horn 104 is operatively attached to the movable switch blade 20 as shown in FIGS. 1A and 1B. As mentioned, the bouncing problem with this arrangement when opening switch 10 between the actuating arm 102 and moving arc horn 104 is often experienced.

Figure 2A:
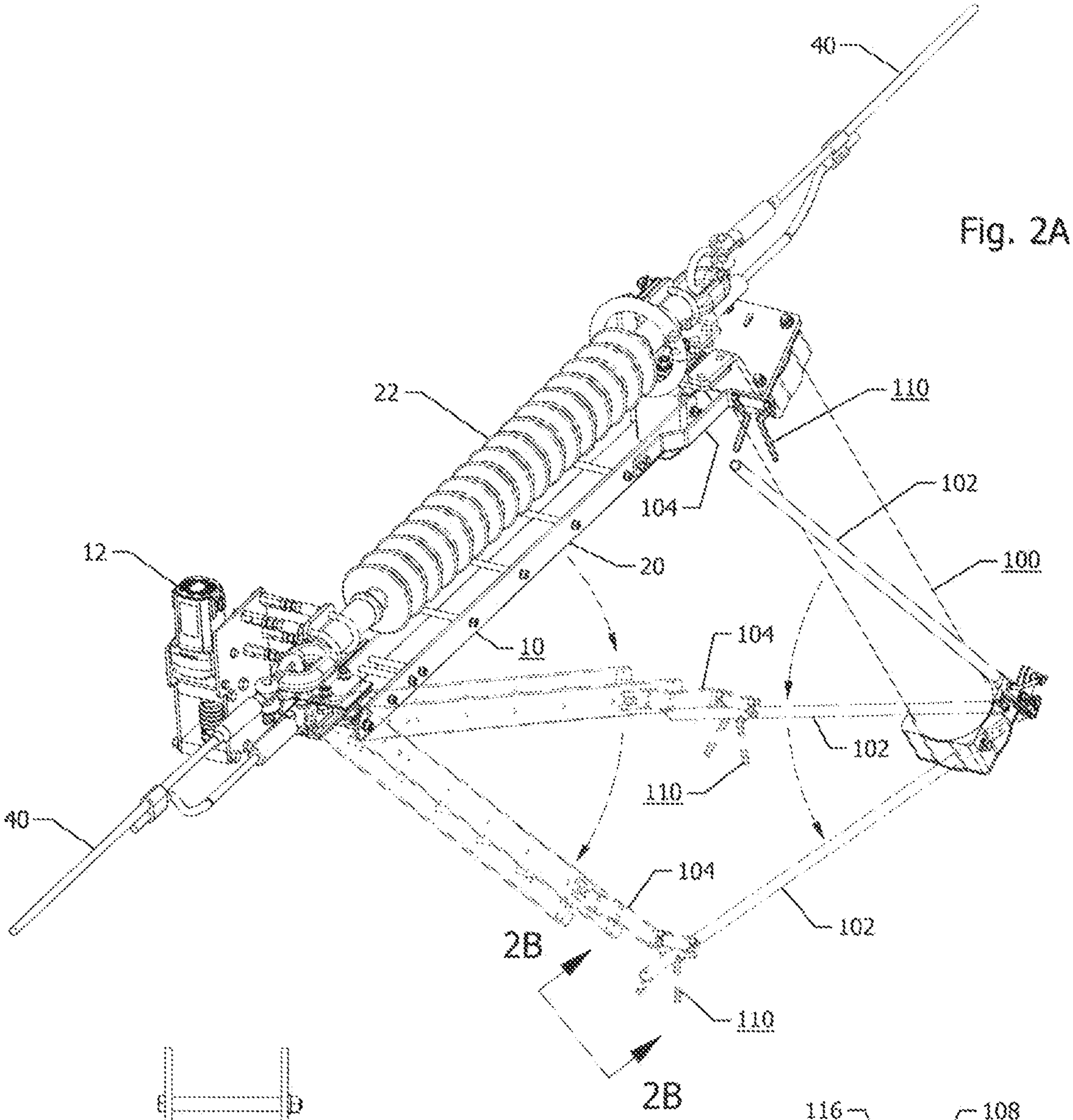
FIG. 2A is a perspective view of the high voltage air break disconnect switch of the present invention in both the electrically closed and open position.
Figure 2B:
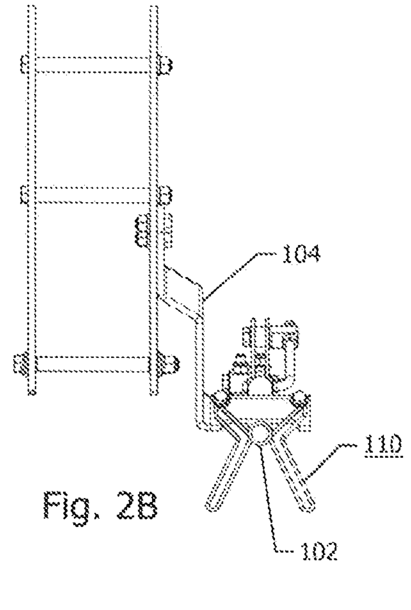
FIG. 2B is an elevation view along the line '2B'-'2B' of FIG. 2A in the partially open position of the switch; and, FIG. 2C is an enlarged elevation view of the spring member of FIG. 2B.
Figure 2C:
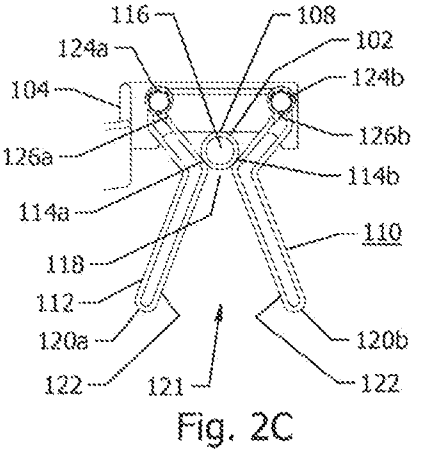

As can be seen in FIGS. 2A, 2B and 2C, the moving arc horn 104 of the present invention has been modified from the prior art moving arc horn 104, shown in FIG. 1B, to include an operatively attached spring catch 110. With regard to FIGS. 2A, 2B and 2C, like numerals represent like components as shown in FIGS. 1A and 1B. The spring catch 110 when mounted on the moving arc horn 104 forms a catch and trap zone 116. The spring catch 110 contacts the actuating arm 102, as shown in FIG. 2C. The catch and trap zone 116 is bordered by two oppositely disposed resilient spring guide fingers 120*a*, 120*b* of the spring catch 110 and the contact point 108 of the arc horn 104. Each of the spring guide fingers 120*a*, 120*b* extend inwardly toward each other to form a catch and trap opening 118 at the entrance to the catch and trap zone 116. The spring guide fingers 120*a*, 120*b* at the catch and trap opening 118 are sized to allow the outer circumference of the actuating arm 102 to pass slidably through the catch and trap opening 118, by utilizing the elasticity of the spring guide fingers 120*a*, 120*b* to sufficiently spread apart from each other at the catch and trap opening 118, to permit the outer circumference of the actuating arm 102 to enter the catch and trap zone 116, upon opening of the switch. After the actuating arm 102 enters the catch and trap zone 116, the spring guide fingers 120*a*, 120*b*, elastically return to their original shape, thereby preventing the actuating arm 102 from exiting the catch and trap zone 116 transversely through the catch and trap opening 118. The catch and trap zone 116 then retains the actuating arm 102 via first and second spring force points 114*a*, 114*b* of the spring catch 110 at contact point 108 to prevent any bouncing between the moving arc horn 104 and the actuating arm 102 for constant physical and electrical contact, during opening of the switch 10. The spring force of the spring guide fingers 120*a*, 120*b* at the first and second spring force points 114*a*, 114*b* stays applied as the switch 10 opens, with switch blade 20 with the moving arc horn 104 attached to the blade 20 and the spring catch 110 attached to the moving arc horn 104, the spring catch 110 engages the actuating arm 102 and continued motion of the blade to the full 180 degree open position, not shown in the drawings, causes the spring catch 110 to slide off the end of the actuating arm 102 after the interrupter 100 has tripped to interrupt the current flow through the switch 10. The spring force of spring catch 110 at the catch and trap zone 116 stays applied until the actuating arm 102 is caused to slide off the end of the actuating arm 102 by normal operation of the switch 10.

The two resilient spring guide fingers 120*a*, 120*b* preferably extend from the catch and trap opening 118 by retroverting away from each other to form a V-shaped chute guide 121 having chute guide surfaces 122 of the spring catch 110 with a wide chute guide opening compared to the catch and trap opening 118. The wide chute guide opening is shown in FIG. 2C at the entrance of the V-shaped chute guide 121 for enabling easy capture of the actuating arm 102 and guiding it to the catch and trap zone 116, during opening of the switch 10.

As can be seen by reference to FIG. 2C, the spring catch 110 may comprise a designed wire form which in this embodiment is a single spring wire 112 that is bent as shown in FIGS. 2B and 2C. The single spring wire 112 forms the resilient spring guide fingers 120*a*, 120*b*. Screws 124*a*, 124*b* respectively attach the spring catch 110 to the moving arc horn 104 as shown in FIG. 2C. Also, as can be seen in FIG. 2C, the single spring wire 112 terminates at each end 126*a*, 126*b*. Of course, the spring catch 110 could comprise, for example, two spring wires to form the spring guide fingers without departing from the scope of the present invention, not shown in the drawings. The spring catch 110 may be made of spring tempered stainless steel, or 17 chrome-7 nickel heat treatable stainless steel, for example.

LIST OF REFERENCE NUMERALS

10 motorized in-line high voltage air break disconnect switch
12 motor
14 rotating hinge contact end
18 hinge end of 10
19 break jaw end
20 switch blade
22 polymer strain insulator
24 hinge contact member
28*a* one end of 22
28*b* other end of 22
30 switch break jaw contact terminal
32 break jaw contact
33 hinge pin
34 switch blade end
36*a* jumper
36*b* jumper
38 hinge terminal
40 transmission line
42*a* transmission line end
42*b* transmission line end
43*a* strain cable fitting
43*b* strain cable fitting
44*a* shackle
44*b* shackle
46*a* chain eye end fitting
46*b* chain eye end fitting
100 interrupter unit
102 actuating arm
104 moving arc horn
106 housing of interrupter unit
108 contact point of 104
110 spring catch
112 spring wire
114*a* first force point
114*b* second force point
116 catch and trap zone
118 catch and trap opening
120*a* first spring guide finger
120*b* second spring guide finger
121 V-shaped chute guide
122 chute guide surfaces
124*a* screw
124*b* screw
126*a* one end of 112
126*b* other end of 112

Of course variations from the foregoing embodiment is possible without departing from the scope of the invention.

What is claimed is:

1. A high voltage air break disconnect switch comprising:

a rotating switch blade operatively connected to a hinge contact member at one end of the rotating switch blade and in operative arrangement with a break jaw contact at the other end thereof, the high voltage air break disconnect switch having an open electrically non-conductive position and a closed electrically conductive position, the rotating switch blade including an integral hinge in operative electrical circuit arrangement with a high voltage electric power line conductor at the one end of the switch blade, the rotating switch blade at the other end thereof including a switch blade end in operative arrangement with a break jaw contact, the break jaw contact in operative electric circuit arrangement with the high voltage electric power line conductor, the switch blade end for contacting the break jaw contact during closing of the high voltage air break disconnect switch in the switch closed electrically conductive position and for losing contact with the break jaw contact during switch opening in the switch open electrically non-conductive position, an electric interrupting device for interrupting current flow including an actuating arm for tripping the electric interrupting device, a moving switch blade member fastened to the rotating switch blade and in operative electrical circuit arrangement therewith, the moving switch blade member having a contact point for contacting the actuating arm during opening of the high voltage air break disconnect switch to trip the electric interrupting device to cause interruption of current flowing through the switch and for establishing a parallel electrical current path through the moving switch blade member and the actuating arm to commute the electrical current of the high voltage air break disconnect switch to the electric interrupter device as the switch opens, a spring catch fastened to the moving switch blade member and the rotating switch blade and in operative electrical circuit arrangement with the moving switch blade member and the rotating switch blade, the spring catch configured to cooperate with the moving switch blade member to engage the outer periphery of the actuating arm with a spring holding force applied to the contact point to prevent arc burning damage due to arcing between the actuating arm and the moving switch blade member as the switch opens, wherein the spring catch has a predetermined shape for guiding and retaining the actuating arm on the contact point on the moving switch blade member as the switch opens during the commutation of the electrical current of the switch through the moving switch blade and the actuating arm to the electric interrupter device until an intended separation of the actuating arm and the moving switch blade member occurs after the electric interrupting device has interrupted the switch current, wherein the spring catch comprises a single electrically conductive spring wire, wherein the single electrically conductive spring wire is configured to apply a spring force to hold the actuating arm and the moving switch blade member together at the contact point, wherein the single electrically conductive spring wire includes a catch zone configured to trap the actuating arm by applying the spring force of the spring catch to hold the actuating arm and the moving switch blade member together at the contact point after the actuating arm enters a one-way catch opening of the catch zone, the one-way catch opening configured to let the perimeter of the actuating arm pass therethrough but blocks the perimeter of the actuating arm from exiting back in a reverse direction through the one-way catch opening and the catch zone is configured to continue to apply the spring force of the spring catch until the catch zone of the spring catch slides along the length of the actuating arm and off the end of the actuating arm upon the high voltage air break disconnect switch fully opening, and, wherein the catch zone is configured to trap the actuating arm to prevent any bouncing between the moving switch blade member and the actuating arm and to prevent the actuating arm from exiting the catch zone back in the reverse direction through the one-way catch opening during the opening of the high voltage air break disconnect switch.

2. The high voltage air break disconnect switch of claim 1, wherein the spring catch is made of spring tempered stainless steel.

3. The high voltage air break disconnect switch of claim 1, wherein the spring catch is made of 17 chrome-7 nickel heat treatable stainless steel.

4. The high voltage air break disconnect switch of claim 1, wherein the moving switch blade member comprises a moving arc horn.

5. The high voltage air break disconnect switch of claim 1, wherein the spring catch is attached to the moving switch blade member by screws.

6. The high voltage air break disconnect switch of claim 1, wherein the single electrically conductive spring wire is configured to form two oppositely disposed resilient spring guide fingers each extending from the attached moving switch blade member inwardly toward each other to form the catch zone with the one-way catch opening.

7. The high voltage air break disconnect switch of claim 6, further comprising a second electrically conductive spring wire, wherein the single electrically conductive spring wire and the second electrically conductive spring wire are configured to form the two oppositely disposed resilient spring guide fingers.

8. The high voltage air break disconnect switch of claim 6, wherein the single electrically conductive spring wire is further configured to form a V-shaped chute guide having surfaces for guiding the actuating arm towards the one-way catch opening.

9. The high voltage air break disconnect switch of claim 8, wherein the two oppositely disposed resilient spring guide fingers each extend from the one-way catch opening by retroverting away from each to other to form the surfaces of the V-shaped chute guide.

10. The high voltage air break disconnect switch of claim 6, wherein the actuating arm is tubular having a circular cross-section.

11. The high voltage air break disconnect switch of claim 10, wherein during the opening of the switch the two resilient spring guide fingers are configured to initially engage the outer circumference of the tubular actuating arm as the actuating arm passes through the one-way catch opening and enters the catch zone, the two resilient spring guide fingers are configured to hold the actuating arm by spring force so that the actuating arm is prevented by the two resilient guide fingers from exiting back through the one-way catch opening as the switch opens and to apply the spring force of the spring catch until the spring catch slides along the length of the tubular actuating arm and off the end of the actuating arm upon the high voltage air break disconnect switch fully opening.

* * * * *